United States Patent
Weldon et al.

(10) Patent No.: US 11,562,099 B1
(45) Date of Patent: *Jan. 24, 2023

(54) SANITIZATION OF CONTENT DISPLAYED BY WEB-BASED APPLICATIONS

(71) Applicant: Allscripts Software, LLC, Raleigh, NC (US)

(72) Inventors: Richard Walter Weldon, San Francisco, CA (US); Nicholas Breen, San Francisco, CA (US); David Kelly Anderson, San Francisco, CA (US); Jacob Castro, San Francisco, CA (US)

(73) Assignee: Allscripts Software, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,713

(22) Filed: Mar. 31, 2020

Related U.S. Application Data (63) Continuation of application No. 14/789,452, filed on Jul. 1, 2015, now Pat. No. 10,614,249.

(51) Int. Cl.
*G06F 21/62* (2013.01)
*G06F 7/04* (2006.01)
*H04N 7/16* (2011.01)
*G06T 11/40* (2006.01)

(52) U.S. Cl.
CPC .......... *G06F 21/6263* (2013.01); *G06T 11/40* (2013.01)

(58) Field of Classification Search
CPC .............................. G06F 21/6263; G06T 11/40
See application file for complete search history.

(56) References Cited

U.S. PATENT DOCUMENTS

| | | | | |
|---|---|---|---|---|
| 7,836,508 B2 * | 11/2010 | Gumpel | ............. | G06F 21/6245 380/252 |
| 8,429,397 B2 * | 4/2013 | Imai | ..................... | G06F 21/608 713/150 |
| 8,577,356 B2 * | 11/2013 | Kornilovsky | ........... | G06F 3/041 455/575.8 |
| 9,075,990 B1 * | 7/2015 | Yang | ....................... | H04L 63/20 |
| 9,081,529 B1 * | 7/2015 | Joshi | ..................... | G06F 3/1239 |
| 9,477,836 B1 * | 10/2016 | Ramam | ................. | H04W 12/02 |
| 9,514,333 B1 * | 12/2016 | Patel | ................... | G06F 21/6245 |

(Continued)

OTHER PUBLICATIONS

"Office Action for U.S. Appl. No. 14/789,452", dated Sep. 30, 2015, 21 pages.

(Continued)

*Primary Examiner* — Darshan I Dhruv
(74) *Attorney, Agent, or Firm* — Calfee, Halter & Griswold LLP (57) ABSTRACT

Embodiments enable a displayed webpage containing sensitive information to be accurately and efficiently sanitized. The sensitive information is contained within a text string of the webpage and displayed using a font specified in a style sheet. The text string that is to be sanitized is determined based on a tag for sanitization associated with the text string. When the tag is determined the text string is rendered using a font from the style sheet that is not legible. Upon rendering, the text string of the webpage is redisplayed using the non-legible font, which effectively sanitizes the text string containing the sensitive information.

17 Claims, 9 Drawing Sheets

(56) References Cited

U.S. PATENT DOCUMENTS

| | | | |
|---|---|---|---|
| 2008/0181396 A1* | 7/2008 | Balakrishnan | G06F 21/62 380/28 |
| 2008/0276166 A1* | 11/2008 | Wang-Aryattanwanich | G06F 40/109 715/264 |
| 2009/0164878 A1* | 6/2009 | Cottrille | G06F 21/6245 726/21 |
| 2009/0207979 A1* | 8/2009 | Russell | H04M 1/656 379/85 |
| 2009/0300481 A1* | 12/2009 | Imai | G06F 21/608 358/1.11 |
| 2011/0090230 A1* | 4/2011 | Bacus | G06F 40/109 345/467 |
| 2011/0126290 A1* | 5/2011 | Krishnamurthy | G06F 21/6263 726/26 |
| 2011/0213608 A1* | 9/2011 | Sun | G06F 40/197 704/8 |
| 2011/0239113 A1* | 9/2011 | Hung | G16H 15/00 715/271 |
| 2011/0258532 A1* | 10/2011 | Ceze | G06F 16/9574 715/234 |
| 2011/0302630 A1* | 12/2011 | Nair | G06F 21/31 726/4 |
| 2012/0036452 A1* | 2/2012 | Coleman | G06F 21/55 715/751 |
| 2012/0066769 A1* | 3/2012 | Latchem | G06F 21/6263 726/26 |
| 2012/0110469 A1* | 5/2012 | Magarshak | H04L 63/0421 715/747 |
| 2012/0159296 A1* | 6/2012 | Rebstock | G06F 40/205 715/205 |
| 2012/0331375 A1* | 12/2012 | Fanning | G06F 16/986 715/234 |
| 2013/0007895 A1* | 1/2013 | Brolley | G06F 21/62 726/28 |
| 2013/0036370 A1* | 2/2013 | Ananthakrishnan | G06F 21/6245 715/753 |
| 2013/0179771 A1* | 7/2013 | Dent | G06F 40/103 715/255 |
| 2014/0019586 A1* | 1/2014 | Saxena | G11C 7/1009 709/217 |
| 2014/0123304 A1* | 5/2014 | Rachlin | G06F 21/60 726/26 |
| 2014/0215356 A1* | 7/2014 | Brander | G06F 3/14 715/753 |
| 2014/0237241 A1* | 8/2014 | Kurosawa | G06F 21/602 713/168 |
| 2015/0149916 A1* | 5/2015 | Mendez | G06F 16/954 715/738 |
| 2015/0161406 A1* | 6/2015 | Fox | G06F 21/6245 726/27 |
| 2015/0200922 A1* | 7/2015 | Eschbach | H04L 63/08 358/1.14 |
| 2015/0212986 A1* | 7/2015 | Lera | G06F 21/10 715/234 |
| 2015/0213288 A1* | 7/2015 | Bilodeau | G06F 21/6254 726/26 |
| 2015/0278534 A1* | 10/2015 | Thiyagarajan | G06F 21/84 726/28 |
| 2015/0312176 A1* | 10/2015 | Jones | H04L 67/10 709/206 |
| 2015/0339479 A1* | 11/2015 | Wang | G06F 40/174 726/22 |
| 2016/0037057 A1* | 2/2016 | Westin | G16H 30/20 348/207.1 |
| 2016/0063269 A1* | 3/2016 | Liden | G06F 21/60 726/26 |
| 2016/0092409 A1* | 3/2016 | Le Henaff | G06F 40/106 715/269 |
| 2017/0004331 A1 | 1/2017 | Weldon et al. | |

OTHER PUBLICATIONS

"Response to the Office Action for U.S. Appl. No. 14/789,452", filed Dec. 28, 2015, 21 pages.

"Final Office Action for U.S. Appl. No. 14/789,452", dated Apr. 18, 2016, 26 pages.

"Response to the Final Office Action for U.S. Appl. No. 14/789,452", filed Oct. 18, 2016, 24 pages.

"Office Action for U.S. Appl. No. 14/789,452", dated Jun. 1, 2017, 24 pages.

"Response to the Office Action for U.S. Appl. No. 14/789,452", filed Nov. 16, 2017, 17 pages.

"Final Office Action for U.S. Appl. No. 14/789,452", dated Feb. 21, 2018, 31 pages.

"Response to the Final Office Action for U.S. Appl. No. 14/789,452", filed Jul. 30, 2019, 11 pages.

"Notice of Allowance and Fees Due for U.S. Appl. No. 14/789,452", dated Dec. 2, 2019, 28 pages.

* cited by examiner

```
<div class="customer-ribbon-content">
    <div class="customer-ribbon-top row">
        <div class="col-sm-12 customer-ribbon-info-container">
            <div class=" customer-ribbon-name is-sanitizable">{{ customer.fullName}}</div>
            <div class=" customer-ribbon-age-gender is-sanitizable">{{ customer.age}} {{ customer.gender}}</div>
            <div class=" customer-ribbon-dob is-sanitizable">{{dob}}</div>
            <div class=" customer-ribbon-home-phone is-sanitizable">{{customer.homePhone}}</div>
            <div class=" customer-ribbon-email is-sanitizable">{{ customer.email}}</div>
            <div class=" customer-ribbon-lastupdate">{{ customer.lastupdate}}</div>
        </div>
    </div>
</div>
```

SANITIZATION OF CONTENT DISPLAYED BY WEB-BASED APPLICATIONS

RELATED APPLICATION

This application is a continuation of U.S. patent application Ser. No. 14/789,452, filed on Jul. 1, 2015, and entitled "SANITIZATION OF CONTENT DISPLAYED BY WEB-BASED APPLICATIONS". The aforementioned application is incorporated in its entirety herein by reference.

BACKGROUND

Field

This field is generally related to sanitizing content displayed by web-based applications.

Background

Users of web-based applications often need to share content displayed by the web-based applications via the screen of a computing device. For example, a user may encounter a problem and would like to share a screenshot with a software provider to troubleshoot the problem. However, the screen may display the user's sensitive information, which the software provider should not be able to see.

Sanitization refers to a process for removing sensitive information from a document or message. Conventionally, users may need to use a raster graphics editor such as ADOBE PHOTOSHOP or PAINT editors to manually sanitize, or redact, portions of the screenshot to keep the sensitive information private. This manual sanitization is often time-consuming and prone to errors, potentially leaving sensitive information un-redacted. To avoid the hassle of redaction, users may choose to send sensitive information to otherwise unauthorized parties. Flexible systems and methods are needed for efficiently and accurately sanitizing sensitive information displayed on a screen.

BRIEF SUMMARY

Embodiments enable content displayed in a webpage on a computing device to be accurately and efficiently sanitized. The computing device displays text strings of the webpage in a font of first font family specified in a style sheet. The first font family maps respective alphanumeric characters of the plurality of text strings to symbolic depictions that are user legible. The computing device determines a text string to be sanitized from the plurality of text strings based on a tag for sanitizing content that is within the webpage and that is associated with the text string. When the text string to be sanitized is determined, the computing device renders the text string in a font of a second font family that is specified in the style sheet and that is associated with the tag. The second font family maps respective alphanumeric characters of the text string to symbolic depictions that are not user legible. Then, the computing device redisplays the webpage with the text string rendered using the font of the second font family to sanitize the content of the text string.

Embodiments include a method, computer-readable storage, and system for efficiently and accurately sanitizing sensitive content within a web page displayed on a screen. Further embodiments, features, and advantages, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable one of ordinary skill in the art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Embodiments relate to sanitizing sensitive information contained in content displayed by web-based applications using one or more font families associated with tags for sanitization. To accurately and efficiently sanitize the displayed content, embodiments determine content from the displayed content to be sanitized based on a tag for sanitization associated with the content. As will be described below, embodiments may additionally determine whether to sanitize displayed content based on a detected action or received indication. Increasing the accuracy and efficiency of sanitizing content enable users to more easily share displayed content that may contain sensitive information. Additionally, the privacy of sensitive information may be more easily protected.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

System

Figure 1:
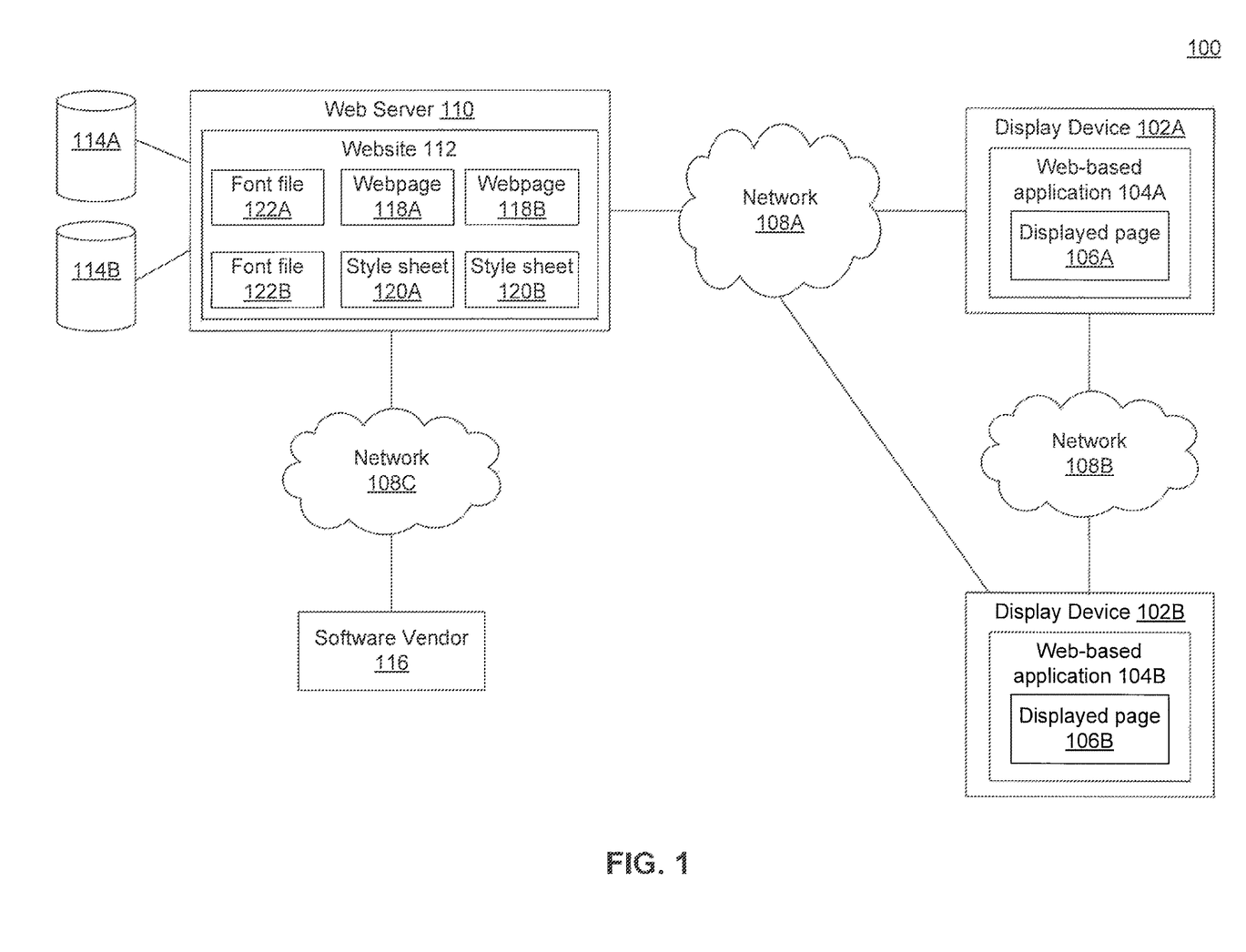
FIG. 1 is a diagram illustrating an example computer system for sanitizing displayed content, according to an embodiment.

FIG. 1 is a diagram illustrating an example computer system 100 for sanitizing content displayed on one or more display devices 102, according to an embodiment. As shown, computer system 100 may include display devices 102, networks 108, web server 110, databases 114, and software provider 116. One or more of the components may be implemented on one or more computing devices. Such a computing device may include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment.

Networks 108A-C may be one or more of the following: local area network (LAN), metropolitan area network (MAN), wide area network (WAN), or any other point-to-point or multipoint-to-multipoint networking protocols. For example, if display devices 102A-B are respectively operated by employees of the same company within a single building, network 108B may likely be a LAN. In an embodiment, one or more of networks 108 may be part of the same network. Other wired or wireless communication techniques, protocols, and technologies may be used for networks 108.

Software vendor 116 may be representative of a business or enterprise configuring and/or providing software as a service (SaaS) or "on-demand software" via network 108 c and webserver 110. In an embodiment, software provider 116 may be representative of vendor servers implemented on one or more computing devices having server capabilities that enable the business or enterprise to configure the software service or application on web server 110. The software service or application provided by software provider 116 may be accessed through website 112 stored on web server 110. In an embodiment, SaaS may enable a user to access website 112 through web-based application 104A, such as a web browser, using display device 102A. The user may access the software service or application without the need for installation of additional custom software. In an embodiment, the enterprise may provide the software service or application through other means, such as through an application software provider (ASP) model, which may require that web-based application 104A be a separately installed client application on display device 102A. Relatedly, the other means may include providing web-based application 104A as a native application or incorporating web-application 104A within a native application on display device 102A. A skilled artisan would recognize that a native application may include an application program developed for use on a particular device or platform, such as an iOS or ANDROID platform.

Databases 114 may contain content retrieved by web server 110 to provide website 112. Some of the retrieved content may include sensitive information that should not be viewable by unauthorized parties. In an embodiment, sensitive information may include personal and private information, confidential information, and classified information. Personal information may include information of various sensitiveness from low-sensitive information such as such as addresses, telephone numbers, and e-mail addresses, to high-sensitive information such as a person's Social Security Number, credit card numbers, and other financial information. Private information may include records of a person's health care, education, and/or employment as protected under privacy laws.

Sensitive information may additionally include personally identifiable information (PII), which may be defined under privacy laws as any information about an individual maintained by an agency, including any information that can be used to distinguish or trace an individual's identity, such as name, social security number, date and place of birth, mother's maiden name, or biometric records; and any other information that is linked or linkable to an individual, such as medical, educational, financial, and employment information. P1 may contain portions of private and personal information.

Web server 110 may be coupled to databases 114 to host the software service or application provided by software provider 116 via website 112. In an embodiment, website 112 may contain or be associated with various files including: webpages 118, style sheets 120, and font files 122.

Figure 2:
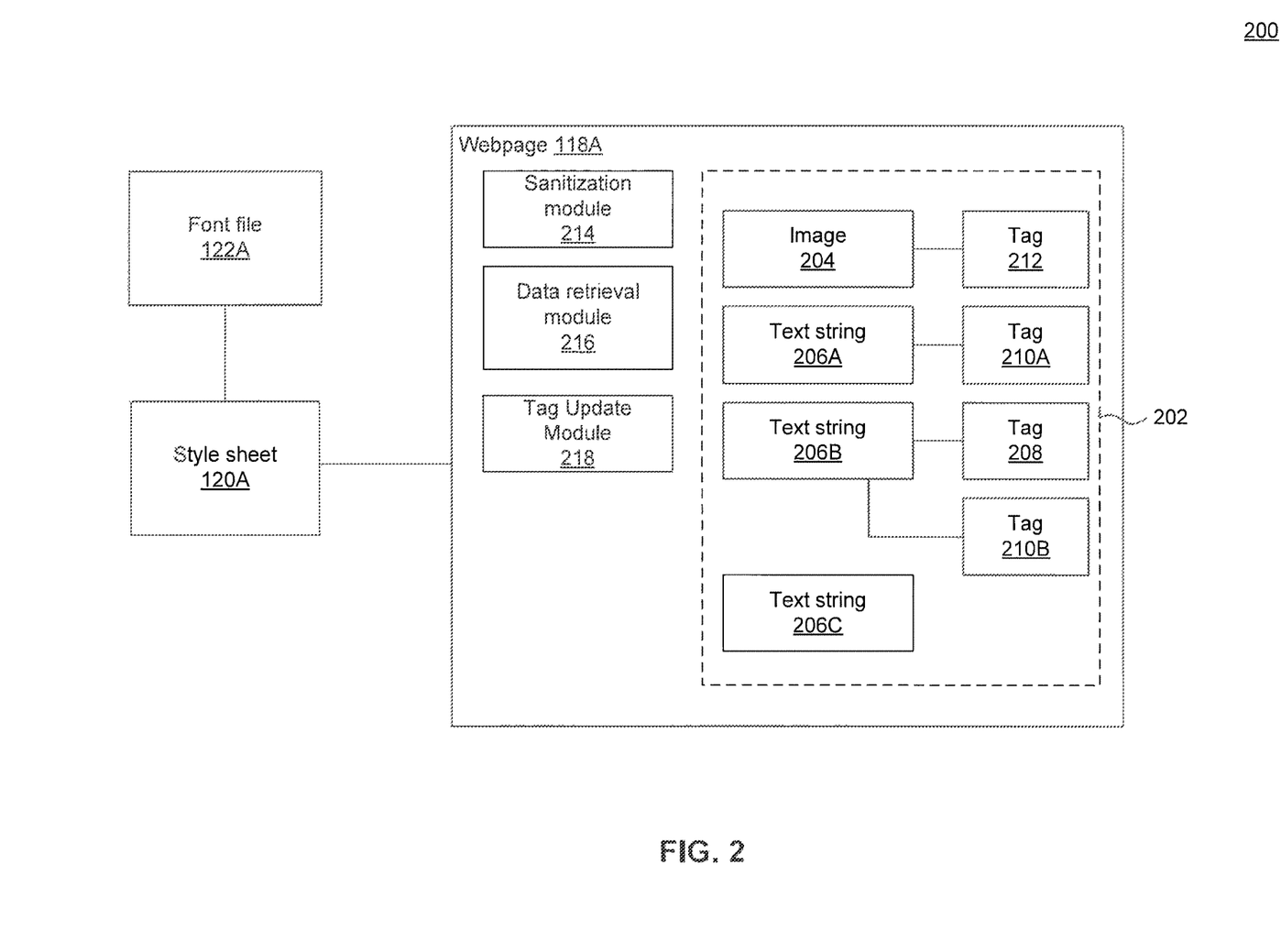
FIG. 2 is a diagram illustrating files and components associated with a webpage for displaying content that is sanitized, according to an example embodiment.

FIG. 2 is a diagram 200 illustrating the files associated with webpage 118A and components contained within webpage 118A for sanitizing sensitive content, according to an example embodiment. Such files include, for example, font files 122 and style sheets 120.

In general, default font families (or typeface) stored by web-based applications, such as web-based application 104, are used to display content of webpage 118A. A skilled artisan would understand that a font family is a group of related fonts that vary only in weight, orientation, width, etc., but not in design. For example, TIMES NEW ROMAN is a font family and an italicized TIMES NEW ROMAN at 14 point would be considered one font of the TIMES NEW ROMAN font family. To support displaying content in a font from other font families, a custom font may be specified in one or more separate font files. Web-based application 104 may access the font family within a font file via the use of style sheets, as will be discussed below. Therefore, font files 122 may be implemented to provide custom font families not supported by web-based applications 104. The font family within, for example, font family file 122A may be used by web-based applications 104 to display content within webpage 118A as displayed pages 106. Conventionally, a font family, including custom font families, defines a mapping between alphanumeric characters and respective glyphs that are legibly understood to represent the alphanumeric characters they respectively represent. A glyph is understood to be a graphical symbol that provides for the appearance or form of a character. For example, font families like TIMES NEW ROMAN or COMIC SANS supply a design for the displayed text without changing the meaning of the text. Alphanumeric characters may include English alphabet characters such as A-Z as well as characters from other alphabetic based writing systems. In an embodiment, the font family may define a mapping between non-alphabetic characters and respective glyphs for displaying non-alphabetic characters.

In an embodiment, to enable accurate and efficient sanitization of sensitive content, font families within respective font files 122 may be designed to display content as sanitized content. Contrary to the conventional use of font families, a font family for sanitization does not map alphanumeric characters to respective glyphs that are legibly understood to represent the alphanumeric characters they respectively represent. In an embodiment, a font family for sanitization may map at least two alphanumeric characters to the same glyph. For example in a font family defined in font file 122A, all the alphabetic characters may be displayed as the same glyph and all the numeric characters may be displayed as a different glyph. In this example, a text string such as "AB ab 12 *$" may be displayed as "  ## *$". For a font family in font file 122B, all the characters may be displayed as the same glyph. Therefore, a text string like "AB ab 12 *$" may be displayed as "AAAAAAAAAAA". In an embodiment, by using a font family for sanitization, webpages 118 may retain the sensitive information, but the content is displayed in a sanitized manner. In an embodiment, by using the font family for sanitization, any text containing sensitive information that is displayed using the font family for sanitization is guaranteed to be displayed as text that is not legible. Therefore, the user may not need to manually sanitize sensitive information, which is both a tedious and error-prone procedure.

Style sheets 120 may be implemented using a style sheet language such as a Cascading Style Sheets (CSS) to contain style rules that specify the presentation, format, and visual layout of the content within webpages 118. In an embodiment, the style rules of style sheet 120A may specify a font of a font family (for example, by referring to), font file 122A containing a font family for displaying sanitized content. In an embodiment, the style rules may be embedded within webpage 118A and/or be embedded in-line within a tag associated with the content instead of a separate style sheet 120A. For example, CODE (1) below depicts an example of code using the @font-face rule within a CSS file that refers to a font (i.e. specifying a weight) of a font family from a font file for sanitization, specifically 'OpenSansSanitization-.ttf' using the TrueType Fonts (TTF) format. Other types of web font formats, such as WOFF, SVG, and EOT may be used depending on whether the formats are supported by a web-based application processing the CSS file.

```
CODE (1)
@font-face {
font-family: 'Open Sans SanitizationTTF';
font-weight:400;
src: url(' . . . /fonts/OpenSansSanitization.ttf') format
    ('truetype');
}
```

Webpage 118A may contain content portion 202, sanitization module 214, data retrieval module 216, and tag update module 218. Content portion 202 may be implemented using a markup language, such as HTML, to specify the semantic content (e.g., image 204 and text string 206) and the structure of the content within webpage 118A to be displayed.

Various content, such as image 204 and text string 206, may be associated with tags that provide for the structure of the content to be displayed. A text string may include a number of characters. In an embodiment, to enable a user operating display device 102A to sanitize content that contains sensitive information, sensitive content within content portion 202 may be associated with tags 208-212 for sanitizing content. For example, both text strings 206A and 206B include sensitive information and are tagged by respective tags 210A and 210B. In an embodiment, to enable web-based application 104 to display sanitized content with greater flexibility, content within content portion 202 may be associated with a plurality of tags 208-212 for sanitizing content. In an embodiment, text string 206C may not contain sensitive information and is not associated with any tags 210-212.

In an embodiment, tags 208 and 210 may be associated with font families within respective font files 122A and 122B. In this example, text string 206B that is associated with tags 208 and 210 may be sanitized according to one of font files 122A or 122B based on user selections. Multiple tags also allow for greater flexibility by enabling the user to selectively sanitize content based on a sensitivity of the content and/or sensitivity type of the content. For example, tag 210B may be associated with PII and tag 208 may be associated with private information.

In an embodiment, non-text based content such as image 204 may be associated with tag 3 212 for sanitizing images. Instead of using font families for sanitizing content, tag 3 212 may be associated with an image that does not contain sensitive information.

One or more of the modules 214-218 may be implemented via server-side and/or client-side scripts to enable a user to interact with content portion 202 and sanitize sensitive content. Client-side scripts may be written in an interpretive language, for example, JAVASCRIPT and are executed by client applications such as web-based application 104 on device 102A. These client-side scripts may enable a user operating device 102A to dynamically interact with webpage 118A displayed as displayed page 106A without further processing by web server 110. Server-side scripts may be written in, for example, PHP, and are executed by web server 110A.

In an embodiment, data retrieval module 216 may be configured to instruct web server 110 to retrieve the content of content portion 202 from databases 114 to be displayed in displayed page 106. In an embodiment, content portion 202 may be implemented within a web template file (not shown). In this embodiment, data retrieval module 216 may contain scripts associated with a template engine to retrieve one or more templates.

In an embodiment, sanitization module 214 may be configured to detect an action that enables displayed content of displayed page 106 that contains potential sensitive information to be viewed by an unauthorized party. For example, sanitization module 214 may detect whether a screenshot of webpage 118A displaying content portion 202 is to be taken on display device 102A. Traditionally, a user may save a screenshot and/or send the screenshot to a party not authorized to view the sensitive information. In another example, sanitization module 214 may detect whether a video recording of content portion 202 is enabled or whether desktop sharing or screen sharing software is being abled on display device 102A to share the contents of displayed page 106A with another user operating display device 102B. In an embodiment, the action may be associated with whether content portion 202 displayed on the screen of display device 102A is to be transmitted to another display device, such as display device 102B. Upon transmitting the displayed page 106A, an unauthorized party operating display device 102B may be able to view content portion 202 containing sensitive information.

Upon detection of the action, sanitization module 214 may temporarily halt the action. Then, sanitization module 214 may automatically sanitize displayed content or request a user using web-based application 104 to confirm that any sensitive information within content portion 202 should be displayed as sanitized content before performing the sanitization. In an embodiment, the action may be resumed upon performing sanitization if needed.

In an embodiment, sanitization module 214 may receive an indication from the user to display sanitized content. To display sensitive information as sanitized content, sanitization module 214 may identify content, such as text string 206A, to be sanitized based on an associated tag for sanitizing, such as tag 210A. Sanitization module 214 may then call tag update module 218.

In an embodiment, tags such as tag 210 may be a software class defined by tag update module 218. Upon being called, tag update module 218 may dynamically inject style rules indicating the use of a font family for sanitization from font file 122A into tag 210 of content portion 202. Accordingly, web-based application 104A may display content portion 202 according to a font of the font family for sanitization in displayed page 106A.

Figure 3A:
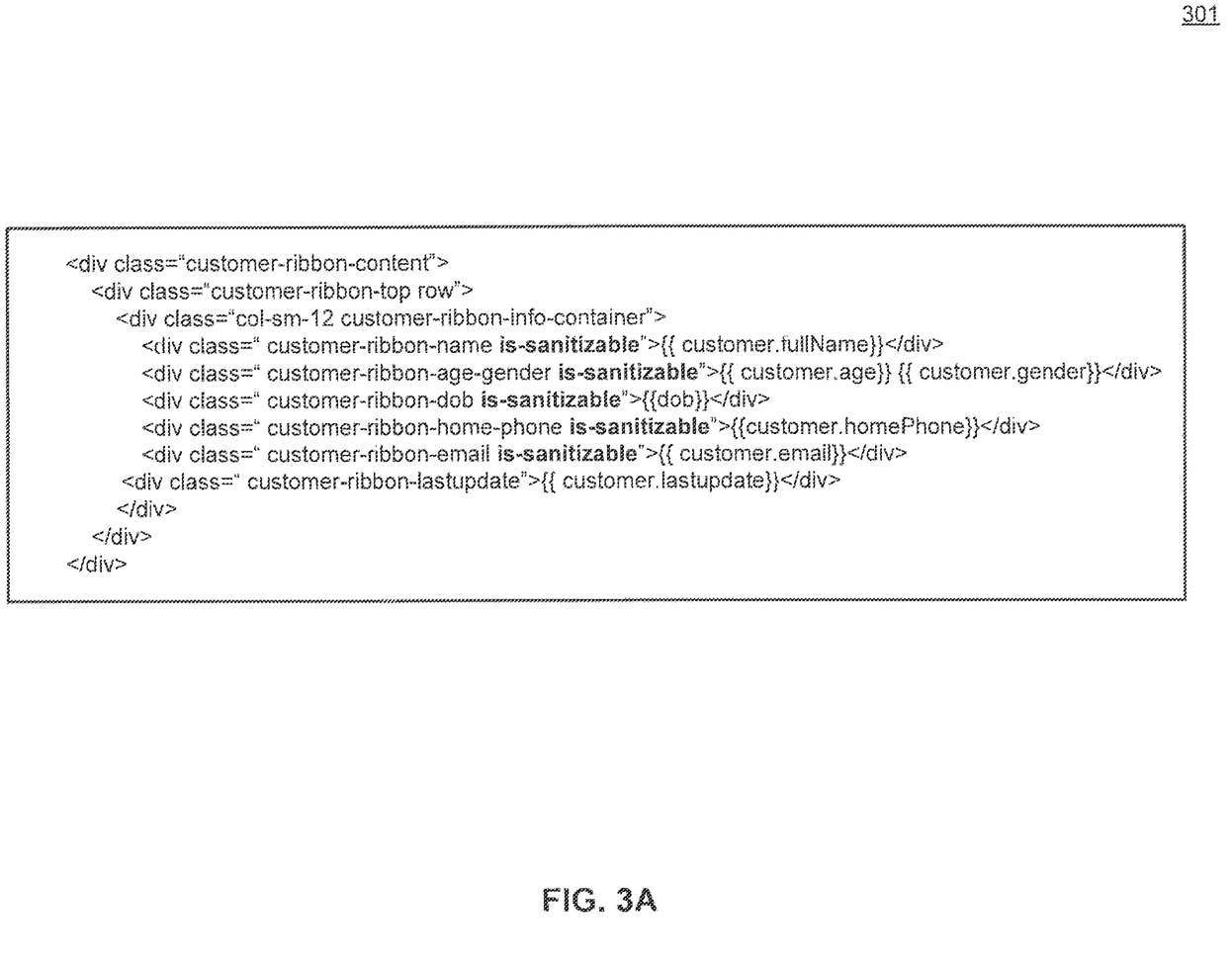
FIG. 3A illustrates an example configuration file specifying which content is to be sanitized.
Figure 3B:
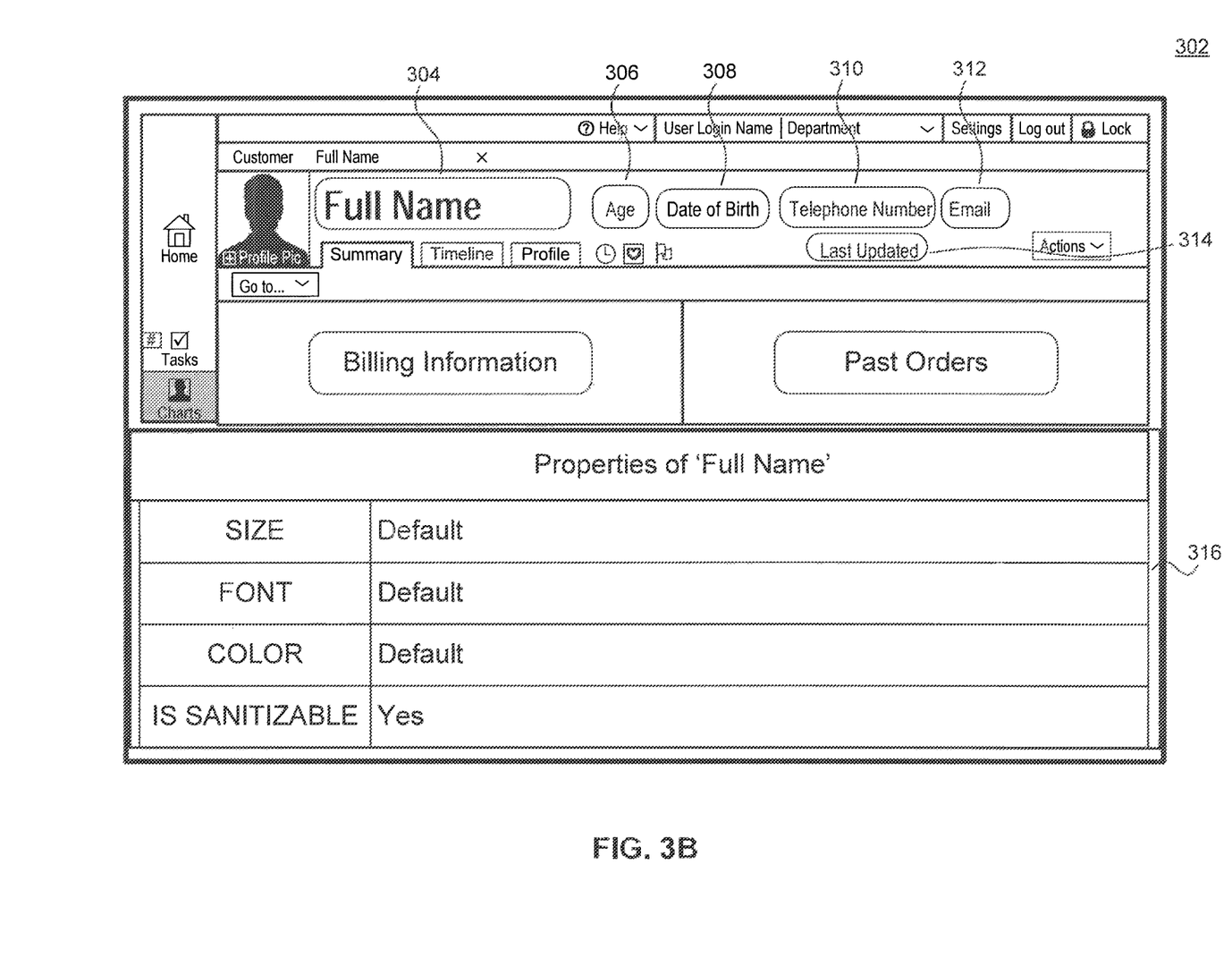
FIG. 3B illustrates an example interface for tagging sensitive content to be sanitized, according to an embodiment.

FIGS. 3A-B are diagrams illustrating example interfaces for tagging sensitive content to be sanitized. FIG. 3A is a diagram illustrating webpage template 301 for content portion 202 in webpage 118A, according to an example embodiment. The bolded text "is-sanitizable" may be representative of a tag for sanitization, such as tag 210. In webpage template 301, the last updated field, "customer-ribbon-last-update," may be representative of text string 206C from content portion 202 that is not associated with any tag for sanitization. The values enclosed by double brackets, such as "customer.fullName" may indicate values to be inserted from a database. Once inserted from the database, the template 301 may become a file readable by a web browser, such as an HTML, page, that is transmitted from a server to a client for display. FIG. 3B is a diagram illustrating webpage editing software 302 for tagging sensitive information with a tag for sanitization, according to an example embodiment. The fields full name 304, age/gender 306, date of birth 308, telephone number 310, email 312, and last updated 314 may each be individually configured to be capable of being sanitized and correspond to the fields displayed in webpage template 301. In an embodiment, software provider 116 may select full names 304 field to configure its properties 316. The "IS SANITIZABLE" property may be configured to "YES".

Returning to FIG. 1, display devices 102 may be any type of computing device capable of displaying content, such as, for example and without limitation, a personal computer, a mobile phone, a tablet, a personal digital assistant (PDA), a workstation, an embedded system device, a game console, a television, or the like. Display device 102A may, for example, include web-based application 104A, such as a web browser, that enables a user to access a software service or application provided by software provider 116 on web server 110 via network 108A. In an example, the software service or application may be accessed through webpages 118 on website 112 stored on web server 110. In an embodiment, display device 102A needs to be an internet-enabled device.

Web-based application 104A may respond to user input, such as user selection of website 112 and/or an associated webpage 118A, by sending a message such as a hypertext transfer protocol (HTTP) request to web server 110 via network 108A. In an embodiment, upon the HTTP request by the user operating display device 102A, web-based application 104A may, for example, retrieve web page 118A from web server 110. Web-based application 104A may additionally retrieve one or more style sheets 120 and font files 122 associated with webpage 118A. Based on the retrieved information and as describe in FIGS. 5-6, web-based application 104A may display content portion 202 of web page 118A on a screen of display device 102A as displayed page 106A.

Figure 4A:
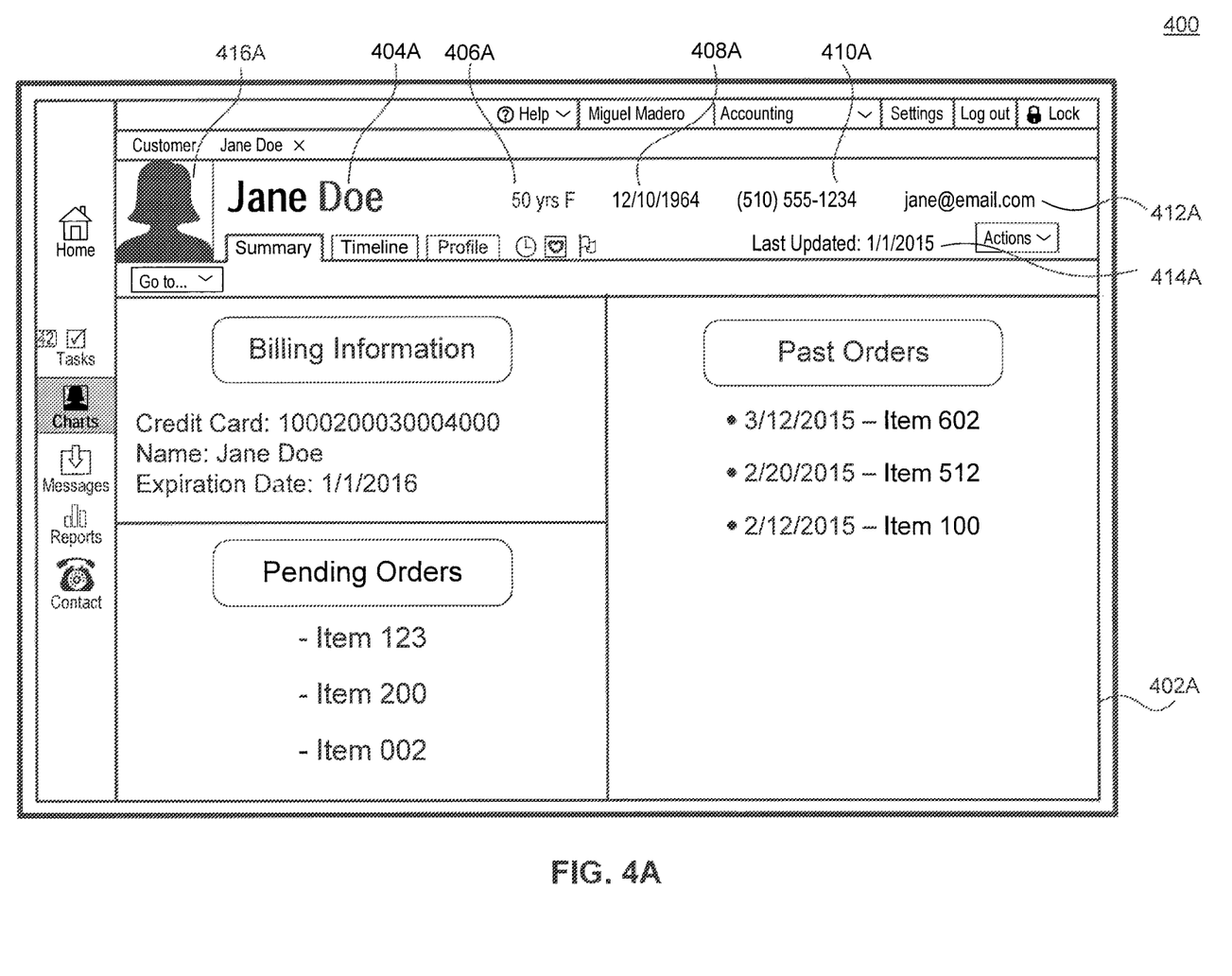
FIGS. 4A-B are example screenshots displaying content before and after sanitization, according to an embodiment.

FIG. 4A is an example diagram 400 illustrating displayed page 106A containing non-sanitized content. As shown, software provider 116 may provide an e-commerce software service enabling the user operating display device 102A to track orders made by the user's customers. As shown, diagram 400 includes potential sensitive information, such as profile picture 416, full name 404 (Jane Doe), age/gender 406 (50 yrs F), date of birth 408 (Dec. 10, 1964), telephone number 410 ((510) 555-1234), email 412 (jane@email.com), and last updated 414 (Jan. 1, 2015). Diagram 400 also shows order information 402, which contains sensitive financial information as well as pending orders and an item order history. The suffix "A" indicates un-sanitized content.

In an embodiment, the user operating display device 102A may encounter an error or problem while using the software service/application that software provider 116 provided via website 112. To resolve the error, the user may contact software provider 116. In an embodiment, a vendor representative operating display device 102B may try to resolve the user's problems. Conventionally, the vendor representative may request the user to use a third-party software application to take a screenshot of displayed page 106A and transmit the screenshot to display device 102B via network 108B. In an embodiment, a "send screenshot and send option" may be included within website 112 and/or webpage 118A. In any case, web-based application 104B may receive the screenshot and display the screenshot as displayed page 106B. Sharing screenshots may enable the vendor representative to more effectively resolve the problem encountered by the user. In an embodiment, the user may enable the vendor representative to remotely access display device 102A and/or remotely view displayed page 106A through desktop sharing software or capabilities provided by website 112. In this scenario, the user cannot manually redact the sensitive information in real-time.

In an embodiment, website 112 and/or webpage 118A may include a "sanitize page option." The user may flexibly toggle this "sanitize page option" to enable the content viewable in displayed page 106A to be optionally sanitized. In an embodiment, the user may enable the "sanitize page option" before taking a screenshot or sharing the screen of display device 102A with another user operating display device 102B.

As discussed with regards to FIG. 2, sanitization module 214 of webpage 118A received by web-based application 104A may detect and/or receive an indication that sensitive information in displayed page 106A needs to be sanitized before transmitting displayed page 106A to an unauthorized user, such as the vendor representative. In an embodiment and further discussed in FIGS. 5-6, upon a determination to sanitize sensitive content displayed in displayed page 106A, web-based application 104A may redisplay webpage 118A in displayed page 106A using a font of a font family for sanitization. Then, the action triggering the sanitization may be performed and a screenshot and/or screen display of display device 102A may be shared with the vendor representative operating display device 102B.

Figure 4B:
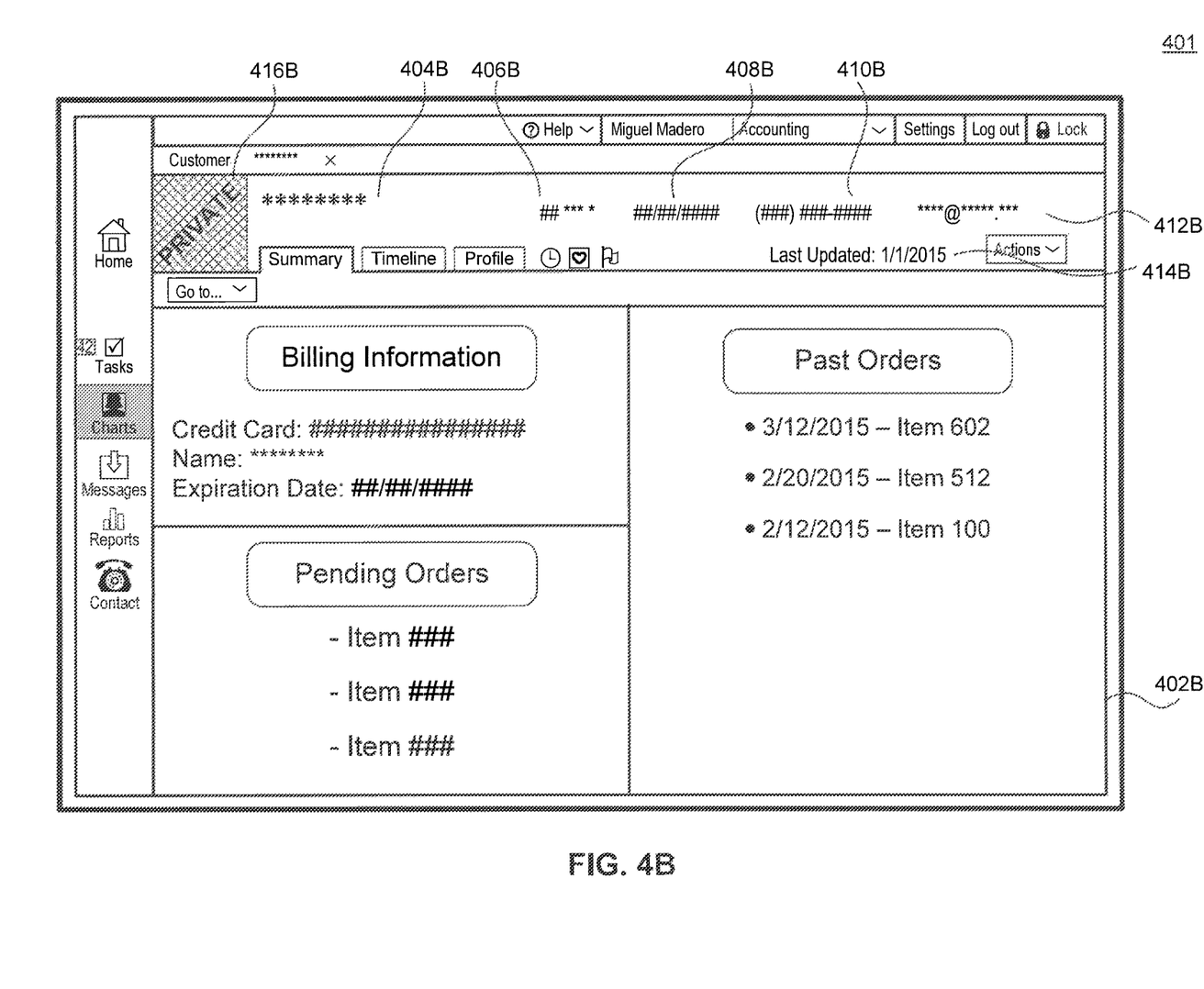

FIG. 4B is an example diagram 401 illustrating displayed page 106A after sanitizing sensitive information. As shown, profile picture 416A from FIG. 4A may be redisplayed as a profile picture 416B that does not contain sensitive information. As discussed with regards to FIGS. 2-3, profile picture 416 may be an example of image 204 associated with tag 3 212 that resulted in the sanitization of profile picture 416A. Similarly, Jane Doe's full name 404A may be redisplayed as "********" in 404B according to the font family for sanitization. In contrast, last updated 414 indicating when Jane's information was last updated may not be sensitive information. With regards to FIG. 2, last updated 414 may be text string 206C, which is not associated with tags 208-212 for sanitization. Therefore, the content of last updated 414 remains the same between FIGS. 4A and 4B.

In an embodiment, sanitization module 214 and/or tag update module 218 may be implemented as client-side scripts. In this example implementation, client-side scripts may enable webpage 118A to be displayed as sanitized content in displayed page 106A without needing to re-retrieved a sanitized webpage 118A from web server 110. Therefore, sanitization of sensitive information to be displayed may be performed faster and without accessing network 108A. In an embodiment, sensitive information from webpage 118A is displayed as sanitized content. But, the sensitive information may remain in display device 102A.

Method

Figure 5:
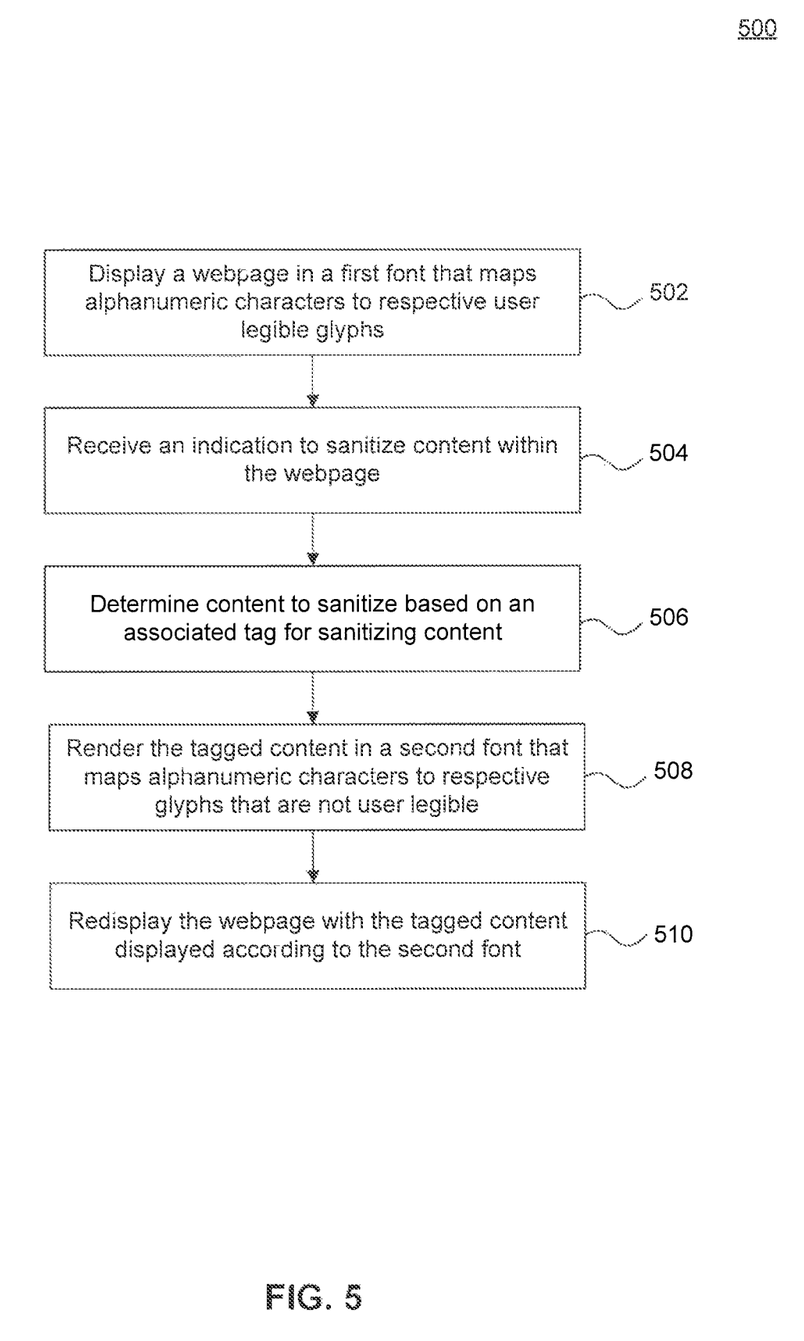
FIG. 5 is a flowchart illustrating an example method for sanitizing displayed content, according to an embodiment.

FIG. 5 is a flowchart illustrating an example method 500 for sanitizing displayed content, according to an embodiment. Method 500 may be performed by processing logic that can comprise hardware (e.g., circuitry, dedicated logic, programmable logic, microcode, etc.), software (e.g., instructions run on a processing device), or a combination thereof. As discussed with regards to FIGS. 1-2, web-based application 104A may retrieve webpage 118A and associated files such as font files 122 and style sheets 120.

In step 502, web-based application 104A may display content portion 202 of webpage 118A in displayed page 106A using a font of a first font family that does not alter the semantics of the displayed content portion 202. For example and further described with respect to FIG. 2, in an embodiment, the first font family may map alphanumeric characters of content portion 202 to respective user-legible glyphs. The first font family may be one of a plurality of font families contained within web-based application 104A or a font from font files 120. The font of the first font family may be specified in style sheets 120.

In step 504, web-based application 104A may perform the instructions of sanitization module 214 to receive an indication to sanitize content within content portion 202 of webpage 118A that is displayed in displayed page 106A. For example, the indication may be a "sanitization option" that the user toggles within website 112 and/or webpage 118A. In an embodiment, the indication may be an action detected by sanitization module 214 that would result in a screenshot of displayed page 106A and/or result in sharing the screen containing displayed page 106A across network 108.

In step 506, web-based application 104A may perform the instructions of sanitization module 214 to determine content from content portion 202 to sanitize based on an associated tag for sanitizing content. For example, text string 206A may be determined to contain sensitive information because text string 206A within content portion 202 is tagged by tag 210A for sanitization.

In step 508, web-based application 104A may render the tagged content, such as text string 206A, in a font of a second font family associated with the tag, such as tag 210A, which does alter the semantics of the displayed text string 206A. For example and further described with respect to FIG. 2, in an embodiment, the second font family may map alphanumeric characters of text string 206A to respective glyphs that are not user legible. Similar to the font of the first font family described in step 502, the font of the second font family may also be specified in style sheets 120.

In step 510, web-based application 104A may redisplay webpage 118A with the tagged content displayed according to the font of the second font family. In an embodiment, only the tagged content of webpage 118A, such as text string 206A, is redisplayed.

Figure 6:
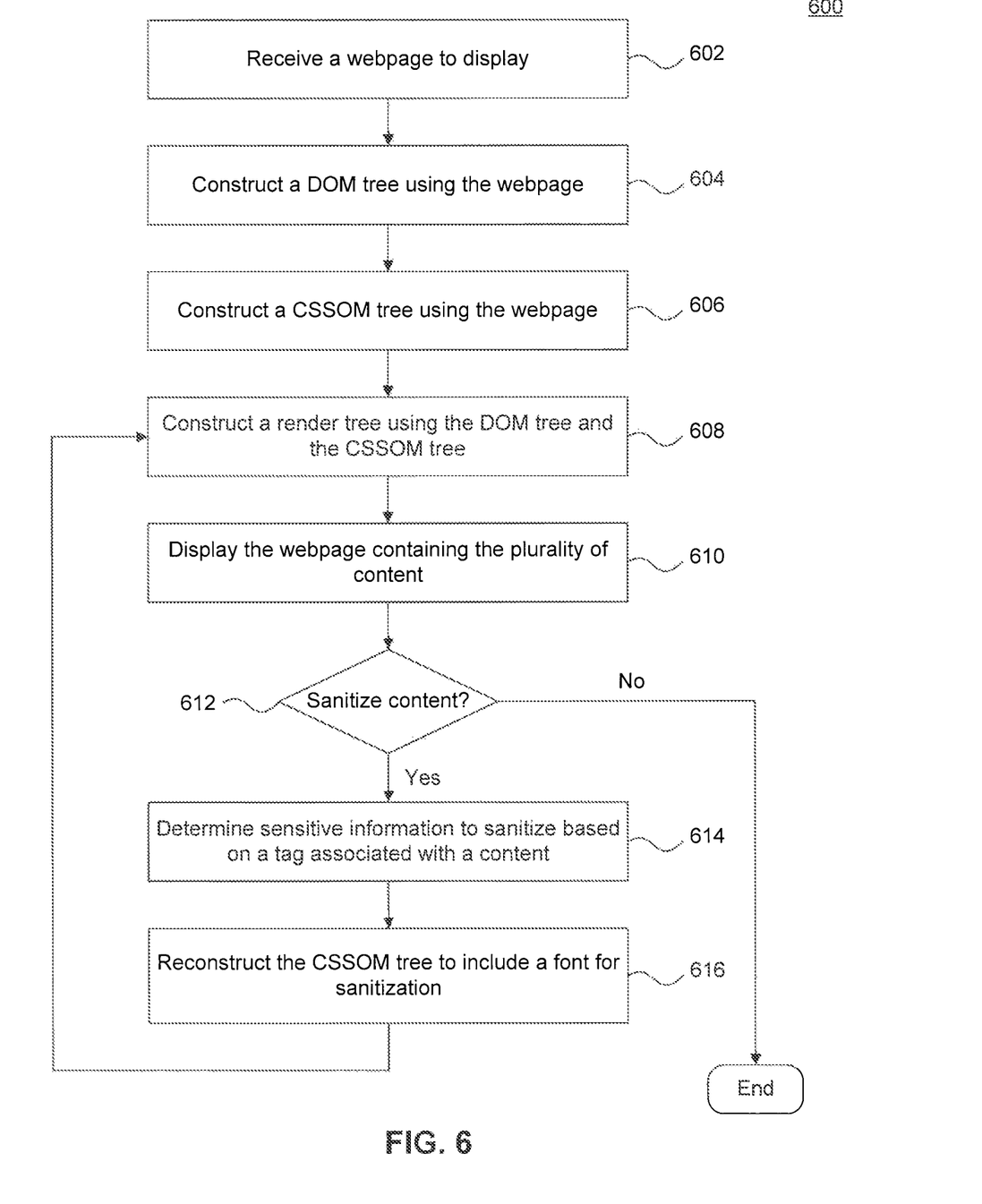
FIG. 6 is a flowchart illustrating an example method for sanitizing displayed content using a web browser, according to an embodiment.

FIG. 6 is a flowchart illustrating an example method 600 for sanitizing displayed content using a web browser, according to an embodiment. Method 600 may be performed by processing logic that can comprise hardware (e.g., circuitry, dedicated logic, programmable logic, microcode, etc.), software (e.g., instructions run on a processing device), or a combination thereof. As discussed with regards to FIGS. 1-2, web-based application 104A may be a web browser that requested webpage 118A and associated files such as font files 122 and style sheets 120 to be transmitted from web server 110 to display device 102A. The request may be an HTTP request.

In step 602, web-based application 104A may receive webpage 118A (and associated files) containing content portion 202 to be displayed in displayed page 106A.

In step 604, a markup language parser, such as an HTTP parser, within web-based application 104A may parse or translate the content structure of webpage 118A to construct a Document Object Model (DOM) tree. Webpage 118A may be received as an HTTP page generated from a template, such as template 301 from FIG. 3A. The DOM tree is an object representation of the content structure of webpage 118A that code and scripts within webpage 118A and/or web-based application 102A can understand and use.

In step 606, a style language parser, such as a CSS parser, within web-based application 104A may parse or translate the style rules from webpage 118A and/or associated style sheets 120 to construct a CSS Object Model (CSSOM) tree. The CCSOM tree is an object representation of the style rules used in displaying the content of webpage. In an embodiment, the style rules may specify a font from a font family not designed for sanitization from the style sheets 120 and/or web-based application 104A. For example, CODE(1) above depicts an example code snippet referring to a custom sanitization font.

In an embodiment, if sanitization of content within received webpage 118A is preset, method 600 may instead perform step 616. In step 616, further discussed below, the style language parser may construct the CCSOM tree based on changes made by tag update module 218. The sanitization of content may be invoked or preset via a sanitization function or variable, respectively. For example, CODE (2) below depicts a code snippet of an example initiation function, 'sanitizeCONTENT: function( )' from sanitization module 214, that may have set a sanitization variable, 'sanitizeCONTENT'.

CODE (2)
define(['boot/config', 'boot/util/StringUtil', 'boot/models/session'],
  function(config, StringUtil, session) {
    . . .
    sanitizeCONTENT: function( ) {
      session. set('sanitizeCONTENT',
      ! session.get('sanitizeCONTENT'));
    }, In step 608, a rendering engine within web-based application 104A may construct a render tree using the DOM tree and the CSSOM tree. The render tree is an object representation of structural and content nodes from the DOM tree that are to be displayed according to the style rules of the CCSOM tree. Upon rendering, a layout engine within web-based application 104A may calculate the exact position and size of content portion 202 to be displayed within a viewport of displayed page 106A.

In step 610, a painting engine within web-based application 104A may traverse the render tree to display content portion 202 of webpage 118A within displayed page 106A.

In step 612, web-based application 104A may determine whether to sanitize content of content portion 202. For example, sanitization module 214 may receive an indication to sanitize content as described in step 504 with respect to FIG. 5. If the determination fails and no sanitization is to be performed, method 600 ends and continues to display webpage 118A within displayed page 106A.

In an embodiment, upon a determination to sanitize content, a sanitization function or variable within sanitization module 214 may be invoked or set, respectively. For example, CODE (3) below depicts an example function, 'updateSanitizeCONTENT' from sanitization module 214, for setting a 'sanitizeCONTENT' variable.

CODE (3)
```
updateSanitizeCONTENT: function( ) {
   this.controllerset('sanitizeCONTENT',
   App.session.sanitizeCONTENT);
}.observes('sanitizeCONTENTProp')
```

In step 614, if the content of displayed page 106A is to be sanitized, web-based application 104A may be configured to execute the instructions associated with tag update module 218 to determine sensitive information in, for example, text strings 206 of content portion 202 to sanitize based on a tag for sanitization associated with text string 206A containing the sensitive information. In step 616, the style language parser within web-based application 104A may reconstruct and/or update the CSSOM tree to include a font family for sanitization as specified by tag update module 218. In an embodiment, method 600 does not proceed to reconstructing or updating the DOM tree because the semantic content and structure of the content has not been altered. By utilizing font families to display sanitized content, only the CSSOM tree may need to be modified. In an embodiment, the style language parser may associate the font family for sanitization with CSSOM tree nodes that are representative of content tagged by a tag for sanitization.

As part of reconstructing the CSSOM tree, tag update module 218 may, for example, first dynamically inject style rules indicating the use of the font family for sanitization from font file 122A into tag 210 of content portion 202. For example, CODE (4) below depicts example code that upon setting a 'sanitizeCONTENT' variable as described in step 612, injects the sanitization font family 'Open Sans Sanitization TTF' into tag 210A containing 'is-sanitizable'.

CODE (4)
```
{{#if sanitizeCONTENT}}
   <style>
      is-sanitizable {
         font-family: 'Open Sans SanitizationTTF' !important;
      }
   </style>
{{/if}}
```

In the example embodiment depicted in CODE (4), when the 'sanitizeCONTENT' condition is not set or unset, the sanitization font family 'Open Sans Sanitization TTF' may be dynamically removed from tag 210A based on the 'if' condition. By removing the font family for sanitization in association with a text string to be sanitized, the text string may instead be displayed according to a default font that is not meant for sanitization.

Upon reconstruction of the CSSOM tree, method 600 proceeds back to step 608 where the rendering engine may reconstruct/update the render tree. When method 600 proceeds to step 610, content containing sensitive information within content portion 202 may be displayed as sanitized content. In an embodiment, only content containing sensitive information needs to be redisplayed.

In an embodiment, various markers within displayed page 106A may indicate whether content within displayed page 106A are being sanitized according to method 600. For example, upon redisplaying sensitive information within content portion 202, a border of displayed page 106A may be bolded. In an embodiment, a menu toolbar within displayed page 106A may display whether sanitization is currently toggled ON and OFF. For example, CODE (5) illustrates the ON or OFF status depending on whether the 'sanitizeCONTENT' variable as discussed in step 612 had been set or unset, respectively.

CODE (5)
```
<li class="helpseparator">Sanitization Options</li>
<li>
   <a {{action "sanitizeCONTENT"}} target="_blank">
   Toggle Sanitization
      {{#if session.sanitizeCONTENT}}
         OFF
      {{else}}
         ON
      {{/if}}
   </a>
</li>
```

In an embodiment, the systems and methods described for sanitization of sensitive information displayed on a webpage may be invaluable to health-related software providers. These health-related software providers often provide a web interface to a customer for accessing an electronic health record (EHR) containing electronic health information about individual patients in a population. Much of the electronic health information may be classified as personally identifiable information (PII), one type of sensitive information that may be protected by privacy laws. The embodiments for efficient and accurate sanitization of sensitive information may enable the customer to share displayed content with the health-related software provider to quickly resolve any problem encountered while using the web interface and ensure any sensitive information in the shared content remain private.

Computer System

Figure 7:
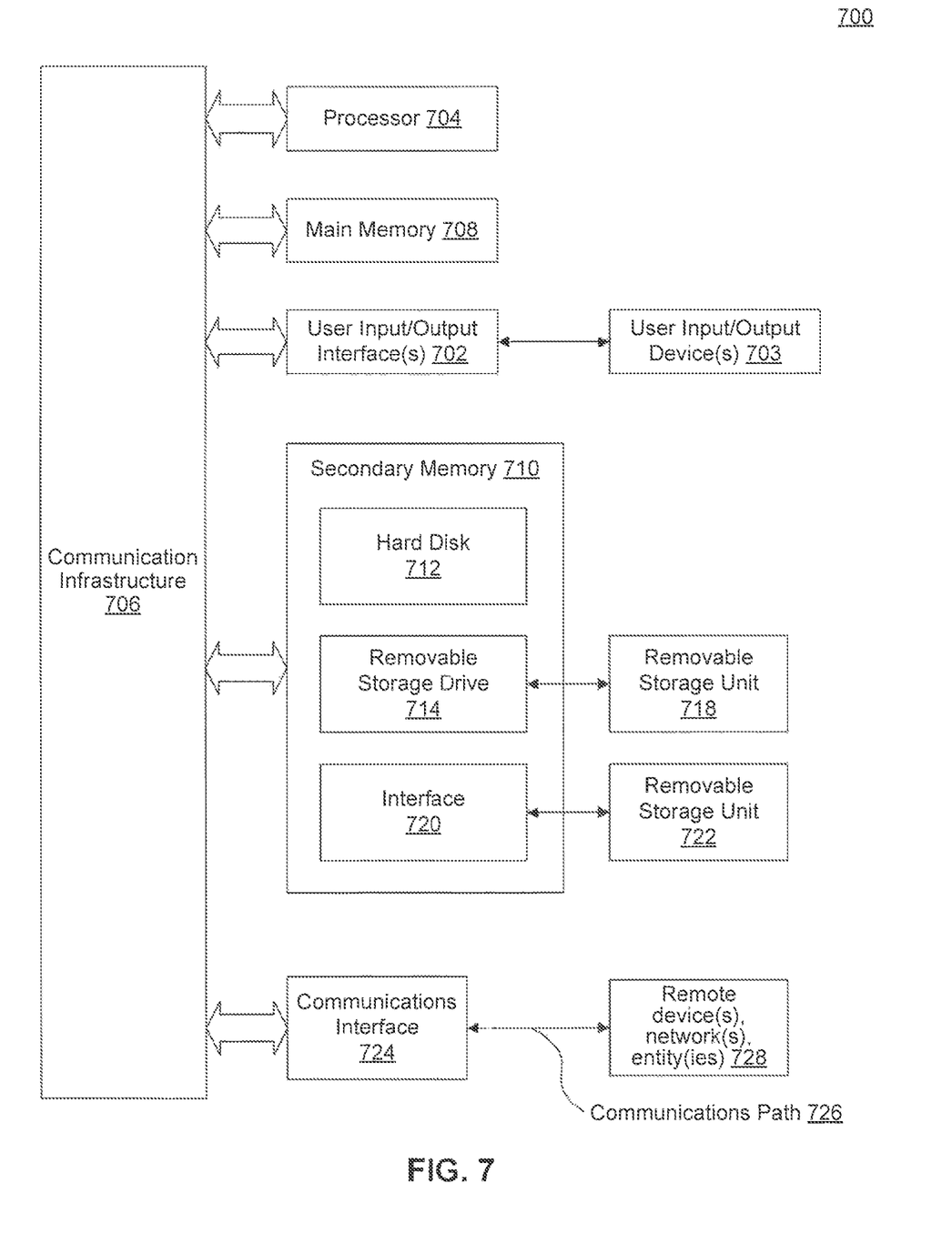
FIG. 7 is a diagram illustrating an example computing system, according to an embodiment.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A computing device operated by a user, comprising:
a processor;
a display; and
memory storing instructions that, when executed by the processor, cause the processor to perform acts comprising:
presenting a webpage on the display, wherein a first glyph is displayed on the webpage, wherein the first glyph represents a computer-readable character that is included in code of the webpage, wherein a first font includes a first mapping of the computer-readable character to the first glyph, wherein the first glyph is displayed based upon the first mapping;
responsive to receiving an indication that the webpage is to be sanitized, accessing a second font, wherein the second font includes a second mapping of the computer-readable character to a second glyph that is different than the first glyph;
replacing the first glyph on the webpage with the second glyph based upon the second mapping;
generating an image of the webpage, the image including the second glyph in place of the first glyph;
causing the image of the webpage to be transmitted over a network connection to a second computing device, wherein the image of the webpage is presented on a second display of the second computing device; and
subsequent to causing the image of the webpage to be transmitted over the network connection to the second computing device, replacing the second glyph on the webpage with the first glyph based upon the first mapping such that the webpage displays the first glyph.

2. The computing device of claim 1, wherein a tag is assigned to the computer-readable character, the tag indicating that the first glyph that represents the computer-readable character contains sensitive information of a person, wherein the first glyph is replaced with the second glyph based upon detection of the tag.

3. The computing device of claim 2, wherein the sensitive information of the person includes at least one of:
an address of the person;
a telephone number of the person;
an e-mail address of the person;
a credit card number of the person;
a social security number of the person;
a date of birth of the person;
a place of birth of the person;
a maiden name of a mother of the person;
medical records of the person;
employment records of the person; or
financial records of the person.

4. The computing device of claim 1, wherein the computer-readable character is comprised by HyperText Markup Language (HTML) of the webpage, wherein the first font and the second font are comprised by cascading style sheets (CSS) of the webpage.

5. The computing device of claim 1, wherein the computer-readable character is not changed when the first glyph on the webpage is replaced with the second glyph.

6. The computing device of claim 1, the acts further comprising:
subsequent to replacing the first glyph on the webpage with the second glyph and prior to generating the image of the webpage, presenting the webpage on the display, wherein the webpage includes the second glyph in place of the first glyph, wherein the second glyph is displayed based upon the second mapping.

7. The computing device of claim 1, the acts further comprising:
prior to presenting the webpage on the display, receiving the webpage from a server computing device over a second network connection.

8. A method executed by a processor of a computing device operated by a user, the method comprising:
presenting a webpage on a display, wherein a first glyph is displayed on the webpage, wherein the first glyph represents a computer-readable character that is included in code of the webpage, wherein a first font includes a first mapping of the computer-readable character to the first glyph;
responsive to receiving an indication that the webpage is to be sanitized, accessing a second font, wherein the second font includes a second mapping of the computer-readable character to a second glyph that is different than the first glyph;
replacing the first glyph on the webpage with the second glyph based upon the second mapping;
responsive to replacing the first glyph on the webpage with the second glyph, generating an image of the webpage, the image including the second glyph in place of the first glyph;
causing the image of the webpage to be transmitted over a network connection to a second computing device, wherein the image of the webpage is presented on a second display of the second computing device; and
subsequent to causing the image of the webpage to be transmitted over the network connection to the second computing device, replacing the second glyph on the webpage with the first glyph based upon the first mapping such that the webpage displays the first glyph.

9. The method of claim 8, wherein the second glyph represents a second computer-readable character that is different than the computer-readable character.

10. The method of claim 8, wherein a tag is assigned to the computer-readable character, the tag indicating that the first glyph that represents the computer-readable character contains sensitive information of a person, wherein the first glyph is replaced with the second glyph based upon detection of the tag.

11. The method of claim 8, further comprising:
prior to presenting the webpage on the display, receiving the webpage from a server computing device over a second network connection.

12. The method of claim 8, further comprising:
subsequent to replacing the first glyph on the webpage with the second glyph and prior to generating the image of the webpage, presenting the webpage on the display, wherein the webpage includes the second glyph in place of the first glyph.

13. A non-transitory computer-readable storage medium comprising instructions that, when executed by a processor of a computing device operated by a user, cause the processor to perform acts comprising:
presenting a webpage on a display, wherein a first glyph is displayed on the webpage, wherein the first glyph represents a computer-readable character that is included in code of the webpage, wherein a first font includes a first mapping of the computer-readable character to the first glyph, and further wherein the first glyph that represents the computer-readable character is indicative of sensitive information of the user;
responsive to receiving an indication that the webpage is to be sanitized, accessing a second font, wherein the second font includes a second mapping of the computer-readable character to a second glyph that is different than the first glyph;
replacing the first glyph on the webpage with a second glyph based upon the second mapping, wherein the second glyph is not indicative of the sensitive information of the user;
responsive to replacing the first glyph on the webpage with the second glyph, generating an image of the webpage, the image including the second glyph in place of the first glyph;
causing the image of the webpage to be transmitted over a network connection to a second computing device, wherein the image of the webpage is presented on a second display of the second computing device; and
subsequent to causing the image of the webpage to be transmitted over the network connection to the second computing device, replacing the second glyph on the webpage with the first glyph based upon the first mapping included in the first font such that the webpage displays the first glyph.

14. The non-transitory computer-readable storage medium of claim 13, wherein the sensitive information of the user are healthcare records of the user.

15. The non-transitory computer-readable storage medium of claim 13, wherein the computer-readable character is not changed when the first glyph on the webpage is replaced with the second glyph.

16. The non-transitory computer-readable storage medium of claim 13, wherein a tag is assigned to the computer-readable character, the tag indicating that the first glyph that represents the computer-readable character contains the sensitive information of the user, wherein the first glyph is replaced with the second glyph based upon detection of the tag.

17. The non-transitory computer-readable storage medium of claim 13, the acts further comprising:

prior to presenting the webpage on the display, receiving the webpage from a server computing device over a second network connection.

\* \* \* \* \*